(12) United States Patent
Ozaki et al.

(10) Patent No.: US 6,280,872 B1
(45) Date of Patent: Aug. 28, 2001

(54) ELECTRODE FOR FUEL CELL AND A METHOD FOR PRODUCING THE ELECTRODE

(75) Inventors: Toshiaki Ozaki; Tatsuya Kawahara, both of Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/458,997

(22) Filed: Dec. 10, 1999

(30) Foreign Application Priority Data

Dec. 11, 1998 (JP) .................................................. 10-352889

(51) Int. Cl.⁷ .............................. H01M 4/86; H01M 4/88
(52) U.S. Cl. ................................ 429/42; 429/40; 429/41; 29/623.1; 29/623.5
(58) Field of Search .................................... 429/40, 41, 42, 429/43, 30, 33; 29/623.1, 623.5

(56) References Cited

U.S. PATENT DOCUMENTS 6,017,650 * 1/2000 Rammuni et al. ...................... 429/40
6,054,228 * 4/2000 Cisar et al. ............................. 429/33

FOREIGN PATENT DOCUMENTS 63-24563   2/1988  (JP) .
5-283082  10/1993  (JP) .

* cited by examiner

*Primary Examiner*—Bruce F. Bell
(74) *Attorney, Agent, or Firm*—Oliff & Berridge, PLC

(57) ABSTRACT

Two electrodes contact an electrolyte membrane on both sides of the electrolyte membrane and each electrode contacts each separator on the other side of the electrode. An electrochemical fuel cell comprises a plurality of unit cells which comprise the electrolyte membrane, the electrode, and the separator. The electrode comprises a catalyst layer and a gas diffusion layer. The gas diffusion layer comprises an inner layer and an outer layer. The catalyst layer contacts the electrolyte membrane. The inner layer is interposed between the catalyst layer and the outer layer. The outer layer of the gas diffusion layer contacts the inner layer on the inner side and the separator on the outer side. Since the gas diffusion layer is formed as a double-layer structure which includes the inner layer having low electric resistance and close and fine structure made of carbon powder and the porous outer layer having a high water repellency, a gas diffusion ability, a water repellency, an electric collection ability of the electrode can be improved.

7 Claims, 3 Drawing Sheets

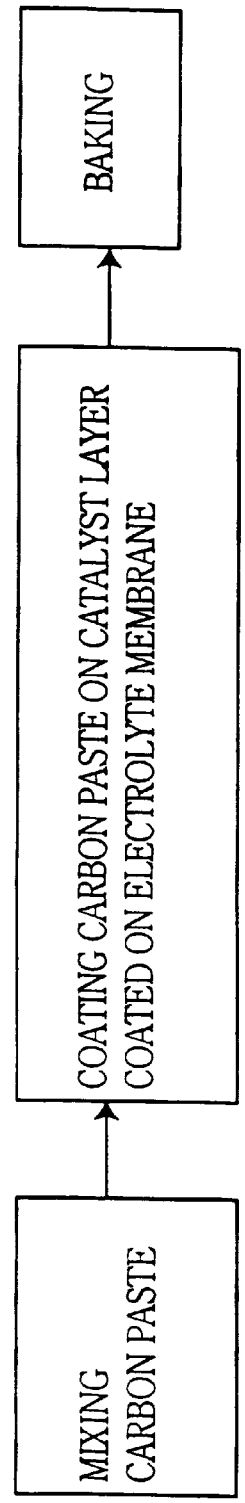
F I G. 3

ELECTRODE FOR FUEL CELL AND A METHOD FOR PRODUCING THE ELECTRODE

FIELD OF THE INVENTION

The present invention relates to an electrode for an electrochemical fuel cell and a method for producing the electrode. An electrode comprising a catalyst layer and a gas diffusion layer contacts an electrolyte membrane and a separator on each side of the electrode.

BACKGROUND OF THE INVENTION

An electrode adopted in an electrochemical fuel cell comprises a catalyst layer and a gas diffusion layer. Two of the electrodes contact an electrolyte membrane on each side of the electrolyte membrane. The catalyst layer functions as an anode or a cathode on each surface of the electrolyte membrane. The gas diffusion layer, which diffuses and supplies gas to the catalyst layer, is deposited on the outer side of the catalyst layer.

The gas diffusion layer functions not only as diffusing a gas as mentioned above, but also as removing moisture which comes out on the surface of the catalyst layer, or etc. Accordingly, a good gas diffusion ability, a good electric conductivity, and a good water repellency are required for the gas diffusion layer.

In order to improve the electric conductivity of the gas diffusion layer, in usual case a carbon-based material such as carbon fiber cloths, a carbon fiber paper, or etc. is used for the gas diffusion layer. By making polytetrafluoethylene (PTFE) permeate into the carbon-based material, the water repellency is added to the characteristics of the gas diffusion layer. Furthermore, by the process of coating a carbon compound (or paste) which is mixed and kneaded with PTFE and carbon powder such as carbon black, the gas diffusion layer is produced. For example, such an electrode in an electrochemical fuel cell is proposed in Japanese Laid-Open Patent Application No. 5-283082.

In the conventional electrode for an electrochemical fuel cell such as the above-mentioned electrode, a carbon-based material such as carbon fiber cloths or a carbon fiber paper is used in order to improve the electric conductivity of the electrode. However, such a conventional electrode is problematic, because the cost of the electrode is high, since such a carbon-based material is expensive.

SUMMARY OF THE INVENTION

It is thus one object of the present invention to solve the aforementioned problems. Another object of the invention is to provide an electrode which has a high performance and a low cost. Another object of the invention is to provide a method for producing such an electrode for an electrochemical fuel cell.

An electrochemical fuel cell comprises an electrolyte membrane, an electrode, and a separator. Two of the electrodes contact the electrolyte membrane on each side of the electrolyte membrane, and the separator contacts on the other side of each electrode. According to one aspect of the invention, as the embodiment of an electrode for an electrochemical fuel cell, the electrode comprises a catalyst layer, and a gas diffusion layer contacting the catalyst layer. The gas diffusion layer comprises carbon powder and a high polymer having a water repellency. The gas diffusion layer may also consist essentially of carbon powder and the high polymer.

For example, the gas diffusion layer comprises an inner layer and an outer layer, and the inner layer is closer-grained than the outer layer. Furthermore, it is also effective that the gas diffusion layer comprises carbon black and that the carbon black in the inner layer is smaller in structure than the carbon black in the outer layer.

A method for producing the electrode comprises coating a catalyst layer on the electrolyte membrane, coating a compound of carbon powder and a high polymer having a water repellency on the catalyst layer, and baking the carbon compound on the catalyst layer.

As mentioned above, according to this invention, a porous carbon-based material is not used for producing the gas diffusion layer in the electrode. Consequently, the cost of the electrode is low.

BRIEF DESCRIPTION OF THE DRAWINGS

The above and other objects, features, advantages, and technical and industrial significance of this invention will be better understood by reading the following detailed description of a presently preferred embodiment of the invention, when considered in connection with the accompanying drawing, in which:

FIG. 3 is a block diagram showing a process for producing an electrode for an electrochemical fuel cell of the present invention.

DETAILED DESCRIPTION OF PREFERRED EMBODIMENTS

Figure 1:
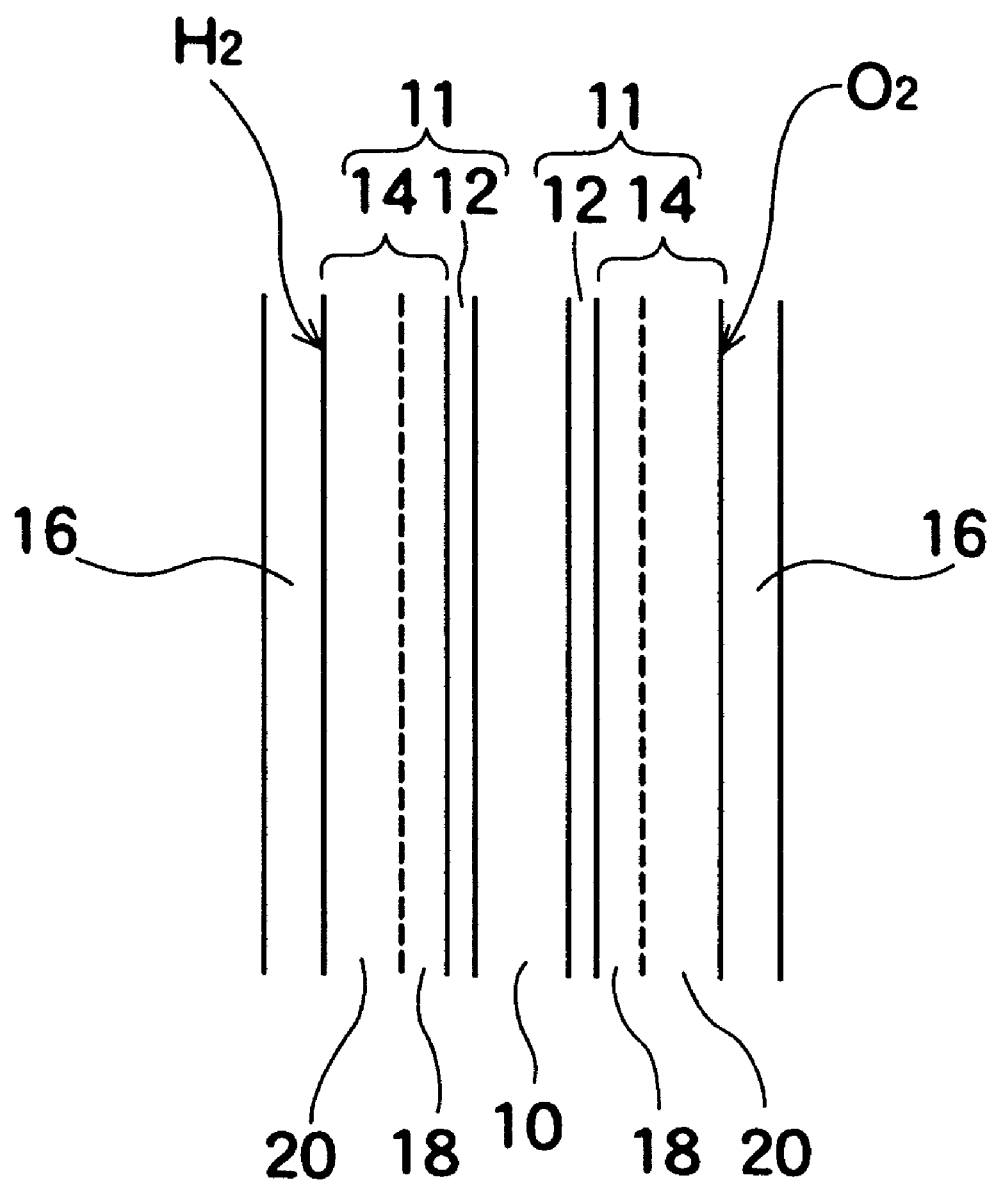
FIG. 1 is a schematic cross-sectional view of a part of an electrode 11 for an electrochemical fuel cell of the present invention.

In the following description and the accompanying drawings, the present invention will be described in more detail in terms of specific embodiments. FIG. 1 schematically shows a cross-sectional view of a part of an electrode 11 for an electrochemical fuel cell of the present invention. In FIG. 1 the electrode 11 comprises a catalyst layer 12 and a gas diffusion layer 14. An electrolyte membrane 10 is interposed between the catalyst layer 12 (for example, shown in the left side of the electrolyte membrane 10) which functions as an anode and the catalyst layer 12 (for example, shown in the right side of the electrolyte membrane 10) which functions as a cathode. At the outer side of the catalyst layer 12 the gas diffusion layer 14 is provided. The gas diffusion layer 14 supplies a hydrogen gas or an oxidative gas as a fuel to the catalyst layer 12, supplies electrons, and collects electricity. Incidentally, the hydrogen gas indicates a gas mainly containing hydrogen, and the oxidative gas indicates a gas mainly containing oxidant. Moreover, a separator 16 is deposited at the outer side of the gas diffusion layer 14. A groove path (not shown in FIG. 1) for supplying the hydrogen gas or the oxidative gas is shaped between the separator 16 and the gas diffusion layer 14. The hydrogen gas or the oxidative gas through this groove path is supplied to the catalyst layer 12 by way of the gas diffusion layer 14.

Carbon-based material such as carbon fiber cloths or a carbon fiber paper is not used for the gas diffusion layer 14. As the embodiment of the present invention, the gas diffusion layer 14 is formed by coating carbon paste (or carbon compound) directly on one surface of each of the two catalyst layers 12 which sandwich the electrolyte membrane 10. The carbon paste is produced by mixing and kneading carbon powder such as a carbon black and a high polymer (also called solid polymer) material having water repellency such as polytetrafluoroethylene (PTFE). Since the electrode 11 is produced as mentioned above and does not use the carbon-based material, with a high cost, such as carbon fiber cloths or a carbon fiber paper, the cost of the electrode 11 can be reduced.

Not only is the cost of the electrode 11 reduced, but the performance of the electrode 11 is also maintained by adopting a double-layer structure having an inner layer 18 and an outer layer 20 for the gas diffusion layer 14. The inner layer 18 of the gas diffusion layer 14 is positioned at the side of the catalyst layer 12, and the outer layer 20 is positioned at the side of the separator 16.

In the inner layer 18, the water repellency is reduced by reducing the containing rate of the PTFE, and the containing rate of the carbon black is higher. The structure (also called secondary grain) of the carbon black used in the inner layer 18 is small. Accordingly, the carbon black of the inner layer 18 is closer and finer, and the rate of the PTFE in the inner layer 18 is low. The electric resistance of the electrode 11 is low, and electricity generated in the catalyst layer 12 is highly collected.

On the other hand, in the outer layer 20, the water repellency is improved by increasing the containing rate of the PTFE, and the outer layer 20 is porous by using the carbon black having a bigger structure. Since the water repellency of the outer layer 20 is improved, moisture coming out on the surface of the catalyst 12 can be smoothly and quickly eliminated. Since the outer layer 20 is porous, a gas diffusion ability can be improved.

As mentioned above, since the gas diffusion layer 14 is formed as the double-layer structure, which includes the inner layer 18 having low electric resistance and high electric collection ability and the outer layer 20 having a high gas diffusion characteristic, a gas diffusion ability, an electric collection ability, and a water repellency, which are all desired for the gas diffusion layer 14, can be improved.

Figure 2:
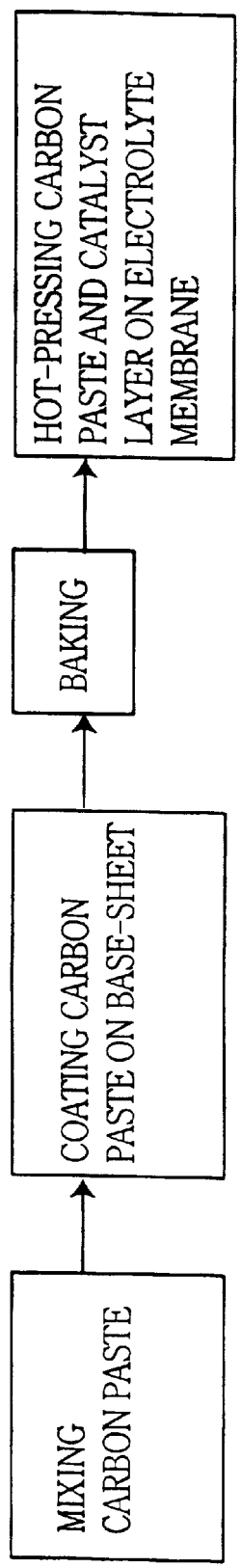
FIG. 2 is a block diagram showing a process for producing a conventional electrode for an electrochemical fuel cell.

In FIG. 2 a conventional producing process of an electrode for an electrochemical fuel cell is illustrated. As mentioned above, a carbon paste is first made up by mixing and kneading carbon black and PTFE, and the carbon paste is coated on a carbon base-sheet made of carbon fiber cloths or carbon fiber paper. Next, baking is executed, and the electrode is finished by hot-pressing the carbon paste and catalyst layers facing on both surfaces of an electrolyte membrane.

On the other hand, in this embodiment of the present invention, as shown in FIG. 3 two kinds of carbon paste which correspond the inner layer 18 and the outer layer 20 are, first, made up by arranging a quality and a quantity of the carbon black and a quantity of the PTFE. Next, by coating the carbon paste directly on the catalyst layers 12 on the electrolyte membrane 10, and by baking the carbon paste with the catalyst later 12 and the electrolyte membrane 10, the electrode 11 for the fuel cell is finished. Comparing FIG. 3 with FIG. 2, it is understood that the process of coating the carbon paste on the carbon base-sheet and the process of hot-pressing the carbon paste on the electrolyte membrane can be eliminated, because the gas diffusion layer 14 does not include the carbon base-sheet. Instead of this, by the coating process of the carbon paste and the baking process, the gas diffusion layer 14 is formed. In this way, the process of producing the gas diffusion layer 14 can be simplified. Furthermore, the thickness of the gas diffusion layer 14 can be reduced, because the carbon base-sheet is not adopted for the gas diffusion layer 14.

Figure 4:
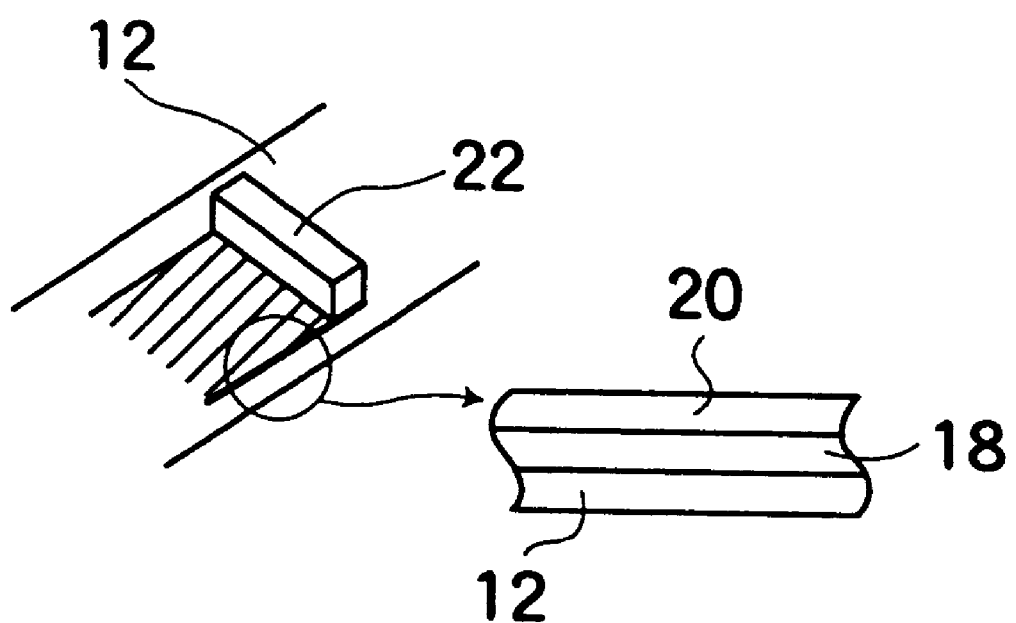
FIG. 4 is an illustration showing how to coat a carbon compound (or carbon paste) on an electrolyte membrane in the producing process explained in FIG. 2.

FIG. 4 illustrates how to coat two kinds of the carbon paste on the catalyst layer 12 in order to form the gas diffusion layer 14. By using a slot-dye-coater 22, two kinds of the carbon paste corresponding the inner layer 18 and the outer layer 20 are coated on the catalyst layer 12 formed on the electrolyte membrane 10, as shown in FIG. 4. In this way, the gas diffusion layer 14 comprising two layers is formed by one process. It is also feasible to coat the carbon paste concurrently on the two catalyst layers 12 which are formed on both surfaces of the electrolyte membrane 10.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An electrode for an electrochemical fuel cell, the electrochemical fuel cell, the electrochemical fuel cell comprising an electrolyte membrane, two of said electrodes contacting the electrolyte membrane on each side of the electrolyte membrane, and a separator on the other side of each electrode, said electrode comprising:

a catalyst layer; and a gas diffusion layer directly contacting said catalyst layer and consisting essentially of carbon powder and a high polymer having a water repellency.

2. The electrode according to claim 1, wherein said gas diffusion layer comprises an inner layer and an outer layer and said inner layer is closer-grained than said outer layer.

3. The electrode according to claim 2, wherein said gas diffusion layer comprises carbon black and wherein the carbon black in said inner layer is smaller in structure than the carbon black in said outer layer.

4. The electrode according to claim 3, wherein said gas diffusion layer comprises a polytetrafluoroethylene (PTFE) and wherein a ratio of PTFE in said inner layer is less than a ratio of PTFE in said outer layer.

5. The electrode according to claim 2, wherein said gas diffusion layer comprises polytetrafluoroethylene (PTFE) and wherein a ratio of PTFE in said inner layer is less than a ratio of PTFE in said outer layer.

6. A method for producing an electrode for an electrochemical fuel cell, the electrochemical fuel cell comprising an electrolyte membrane, two of said electrodes contacting the electrolyte membrane on each side of the electrolyte membrane, and a separator on the other side of each electrode, said method comprising:

coating a catalyst layer on said electrolyte membrane; and coating a compound consisting essentially of carbon powder and a high polymer having a water repellency directly on said catalyst layer.

7. The method for producing an electrode for an electrochemical fuel cell according to claim 6, wherein said method further comprises baking said carbon compound on said catalyst layer.

* * * * *